A. W. NELSON.
AUTOMATIC SIDE DRESSER FOR CIRCULAR SAWS.
APPLICATION FILED NOV. 29, 1911.
1,051,153.
Patented Jan. 21, 1913.
5 SHEETS—SHEET 1.
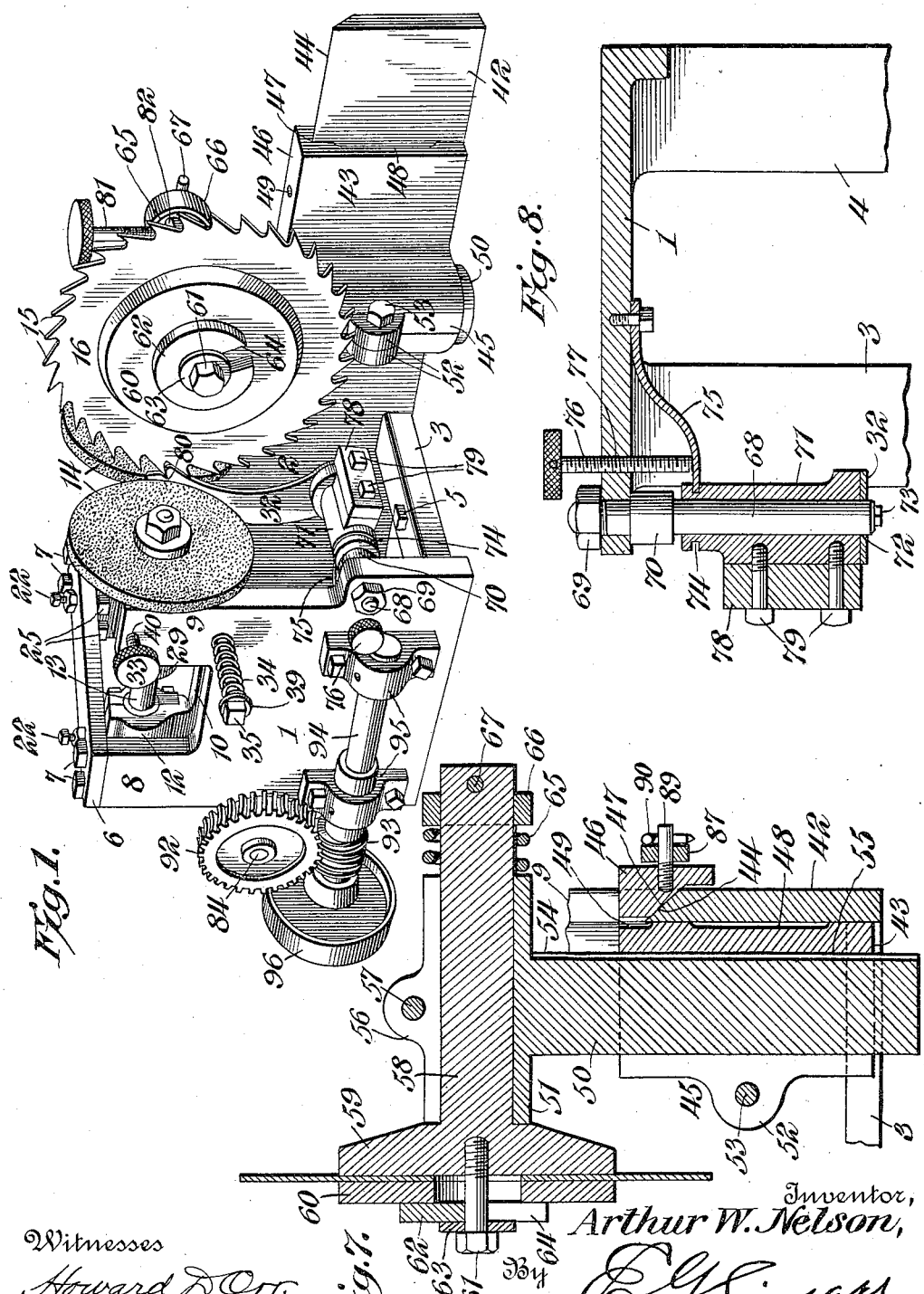

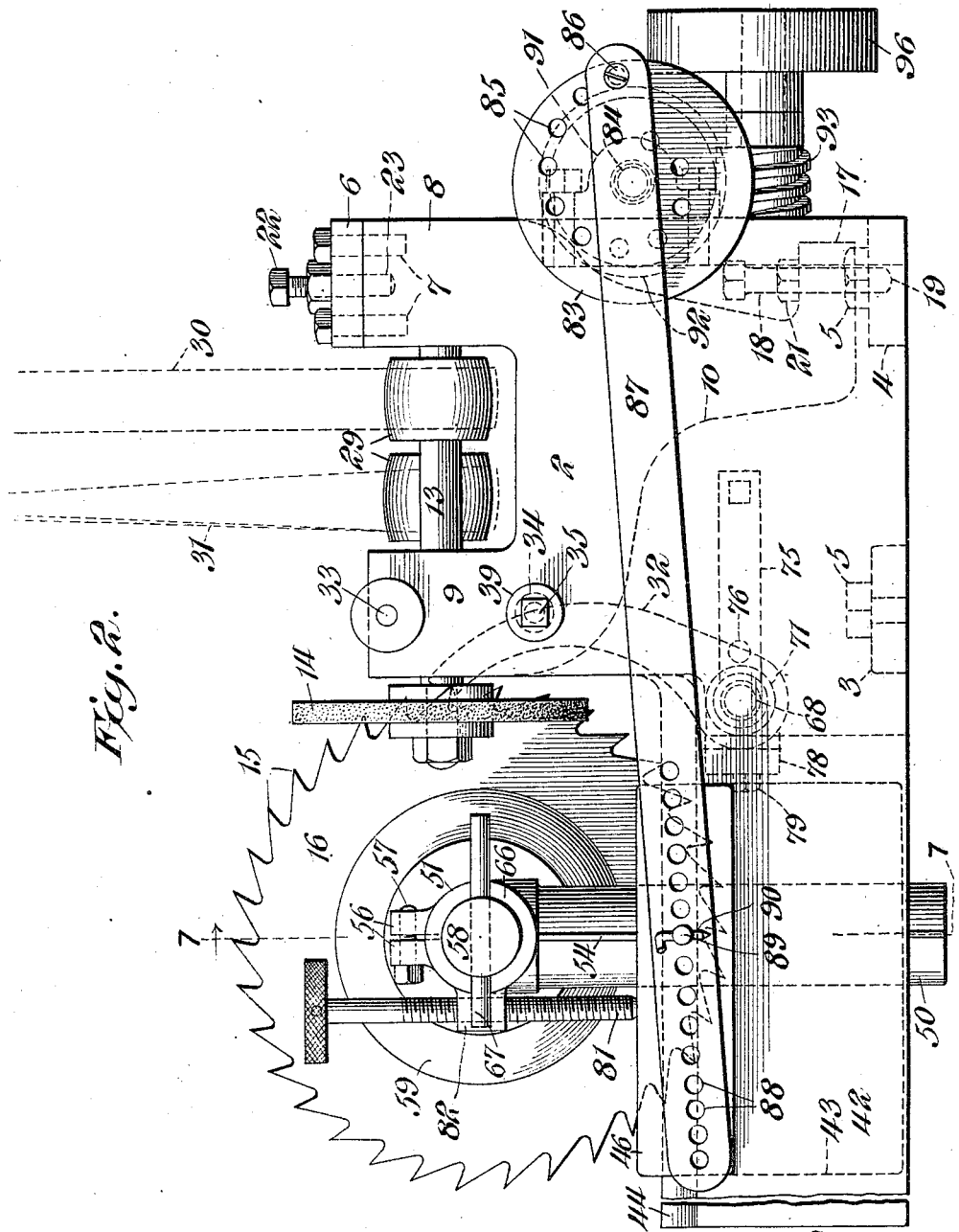

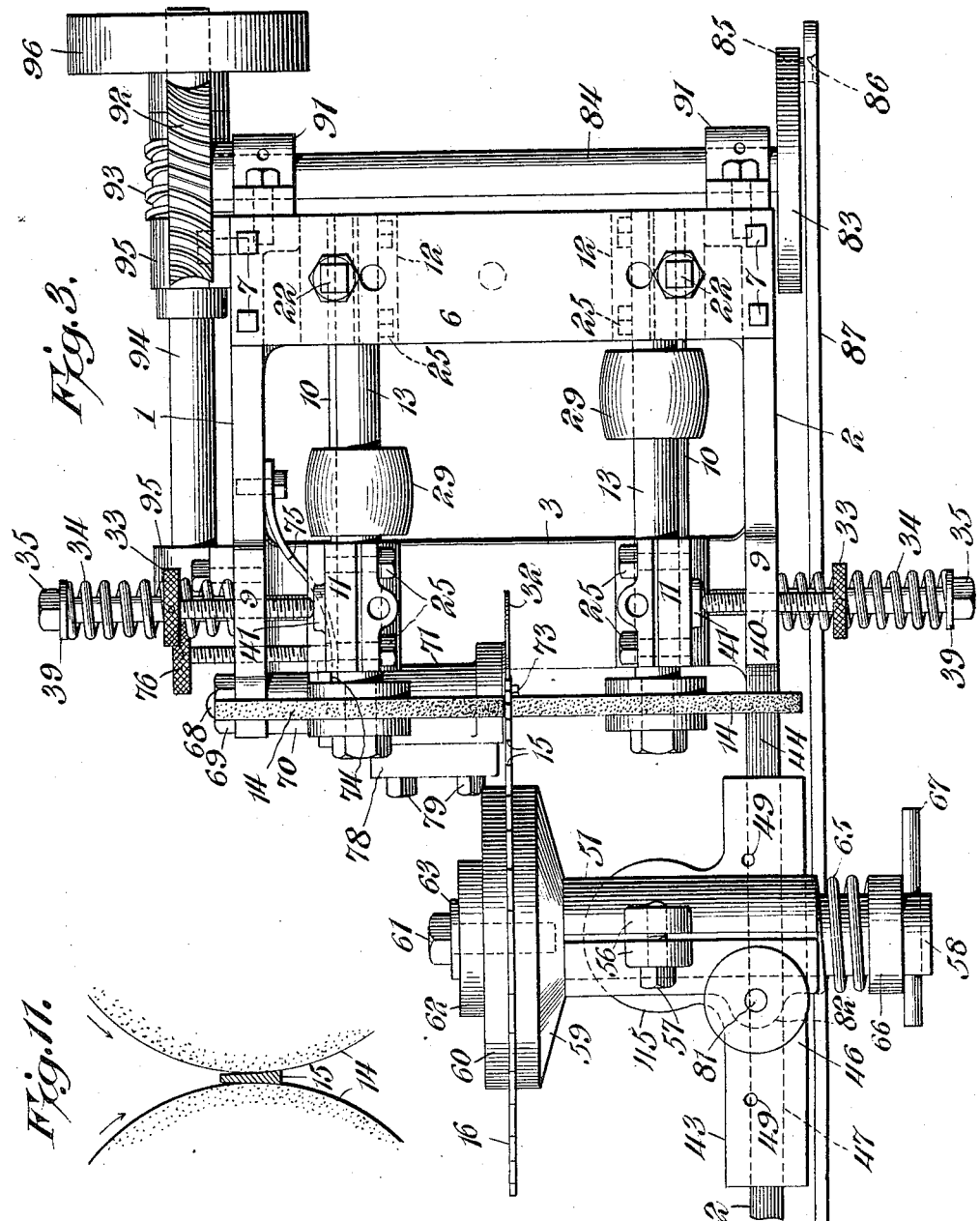

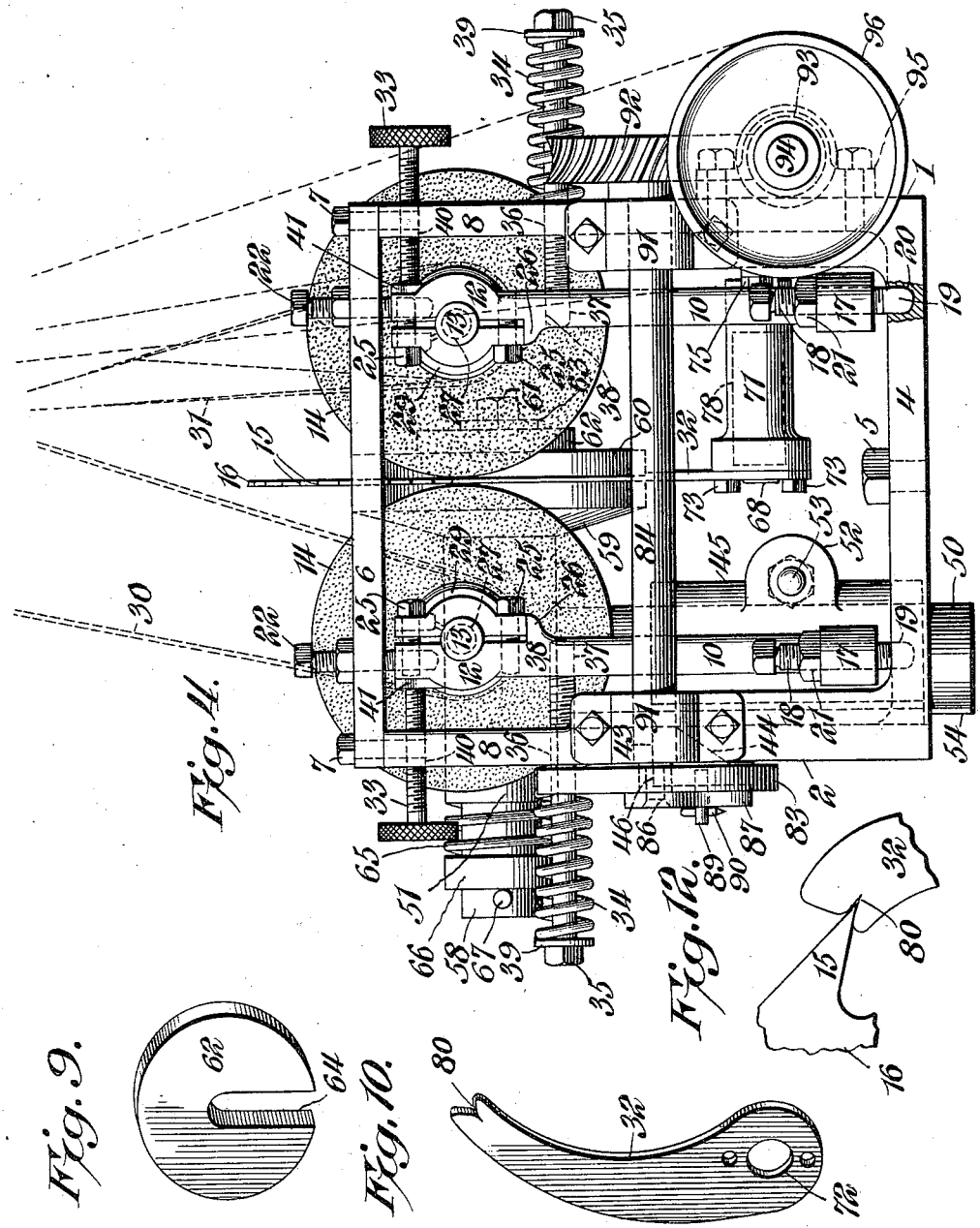

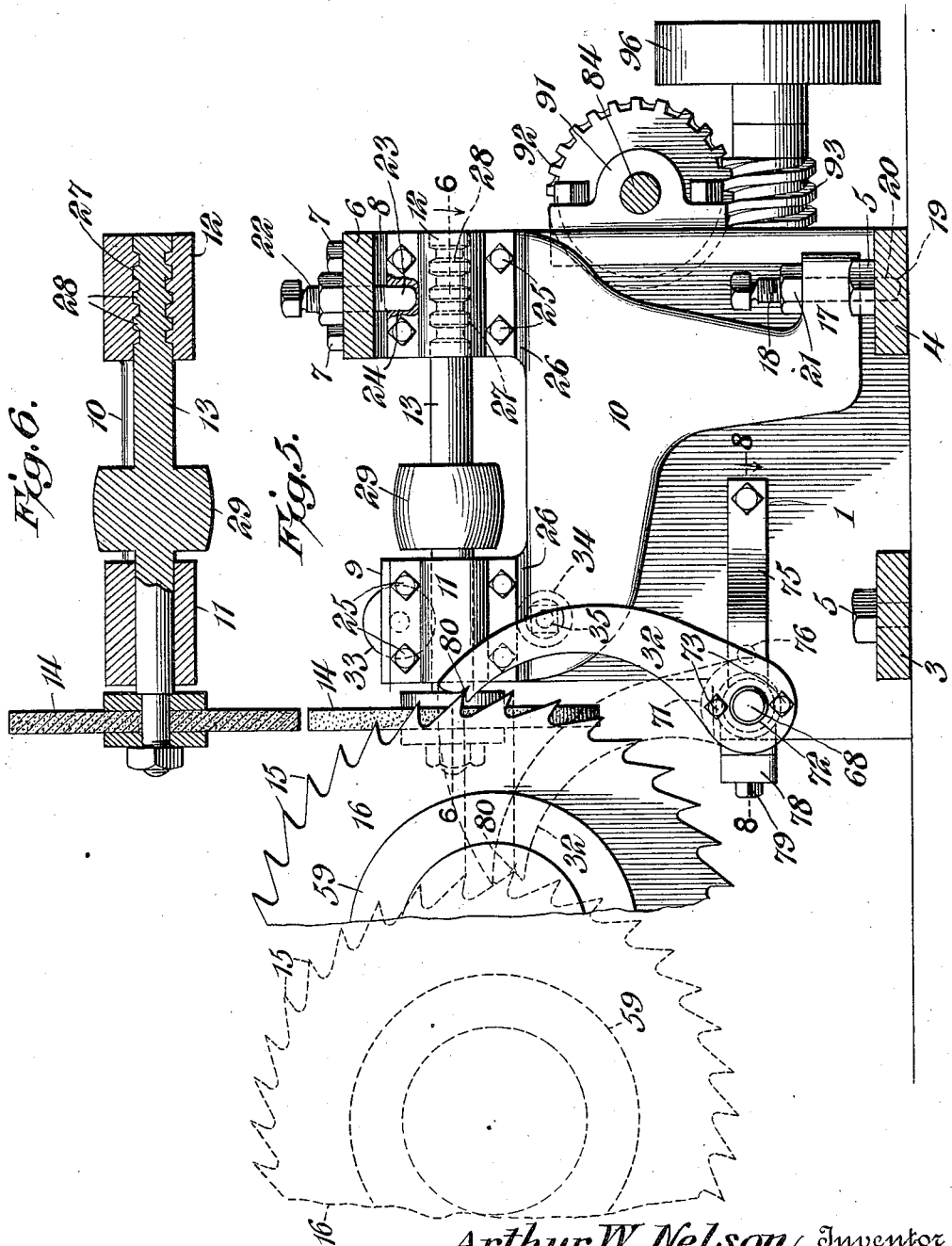

UNITED STATES PATENT OFFICE.

ARTHUR W. NELSON, OF WILLIAMSPORT, PENNSYLVANIA, ASSIGNOR TO HERMANCE MACHINE COMPANY, OF WILLIAMSPORT, PENNSYLVANIA, A CORPORATION OF PENNSYLVANIA.

AUTOMATIC SIDE DRESSER FOR CIRCULAR SAWS.

1,051,153. Specification of Letters Patent. Patented Jan. 21, 1913.

Application filed November 29, 1911. Serial No. 663,093.

*To all whom it may concern:*

Be it known that I, ARTHUR W. NELSON, a citizen of the United States, residing at Williamsport, in the county of Lycoming and State of Pennsylvania, have invented a new and useful Automatic Side Dresser for Circular Saws, of which the following is a specification.

The invention relates to improvements in machines for dressing saw teeth.

The object of the present invention is to improve the construction of machines for dressing the teeth of circular saws, and to provide a simple, efficient and comparatively inexpensive saw dressing machine, adapted to uniformly and accurately dress the teeth of a circular saw after the same has been swaged, and capable of automatic operation to present successively the teeth of the saw to the grinding wheels.

A further object of the invention is to provide a saw dressing machine of this character, in which ordinary grinding disks or wheels having cylindrical peripheral edges may be employed to dress the teeth of circular saws, and arranged so that the curvature of the peripheries of the grinding disks or wheels will produce the desired clearance of the teeth, thereby obviating the necessity of employing for this purpose beveled grinding wheels, which are difficult to maintain in proper condition.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a saw dressing machine, constructed in accordance with this invention. Fig. 2 is a side elevation of the same. Fig. 3 is a plan view of the saw dressing machine. Fig. 4 is a rear elevation thereof. Fig. 5 is a longitudinal sectional view, the saw being partly broken away, and illustrating in dotted lines the operation of the automatic tooth supporting dog. Fig. 6 is a horizontal sectional view on the line 6—6 of Fig. 5. Fig. 7 is a vertical sectional view on the line 7—7 of Fig. 2. Fig. 8 is a horizontal sectional view on the line 8—8 of Fig. 5. Fig. 9 is a detail perspective view of the slotted disk or plate. Fig. 10 is a detail perspective view of the tooth supporting dog. Fig. 11 is a detail sectional view, illustrating the arrangement of the grinding wheels with relation to the tooth operated on. Fig. 12 is an enlarged detail view of a portion of the dog and a saw tooth, illustrating the construction of the tooth receiving recess of the dog.

Like numerals of reference designate corresponding parts in all the figures of the drawings.

In the accompanying drawings in which is illustrated the preferred embodiment of the invention, the frame of the machine is composed of spaced parallel sides 1 and 2, connected at the bottom by integral transverse bars or portions 3 and 4, arranged at the front and back of the frame in flush relation with the lower edges of the sides 1 and 2, and pierced by screws or bolts 5 for securing the machine upon a bench or other suitable support. The sides of the frame are also connected at the top by a transverse bar 6, arranged at the rear portion of the frame and secured by screws 7, or other suitable fastening devices to the upper edges of rear extensions 8 of the sides 1 and 2, which are also provided with corresponding front upwardly projecting portions or extensions 9. The frame or frame-work of the machine, however, may be constructed in any other desired manner.

Within the frame of the machine are pivotally mounted opposite bearing brackets 10, having enlarged upper portions equipped with horizontally alined front and rear sectional bearings 11 and 12 for the reception of longitudinal shafts 13 of transversely disposed grinding disks or wheels 14, located at opposite sides of the front portion of the machine and consisting of flat disks or wheels having plain cylindrical peripheral edges, adapted to engage the teeth 15 of a circular saw 16 at opposite sides thereof, the curvature of the wheels being adapted, as clearly illustrated in Fig. 11 of the drawings, to grind out the teeth back of the front cutting face so as to properly dress the teeth and provide the desired clearance of the same. The front and rear sectional bearings project upwardly from the enlarged top portions of the brackets, which are approximately Y-shaped, as clearly illustrated in Fig. 5 of the drawings. The bearing brackets are provided at their bottoms with rearwardly extending arms 17, having threaded openings for the reception of lower vertical pivot screws 18, which have rounded lower ends 19, fitting in bearing sockets 20 in the rear lower transverse bar or piece 4. The lower pivot screws are secured in their adjustment by lock nuts 21, arranged on the upper portions of the screws and engaging the upper edges of the arms 17. By this construction, the pivots may be readily adjusted to take up the wear of the parts and may be securely clamped in such adjustment. The bearing brackets 10 are pivoted at the top by means of vertical screws 22, mounted in threaded openings in the top transverse bar 6, and provided with rounded lower ends 23 fitting in sockets 24 in the rear sectional bearings 12, one of the sections of each of the bearings 12 being formed integral with the bearing bracket 10 and having the said socket 24. The front sectional bearings are also provided with integral sections. The detachable sections of the front and rear bearings 11 and 12 are connected with the fixed bearings by screws 25, and the bearing brackets are provided with projecting ledges 26, receiving and supporting the detachable sections of the bearings. The bearings may be of any preferred construction, and the rear bearings are preferably provided with annular grooves 27, receiving collars or flanges 28 of the shafts 13, which are thereby interlocked with the bearings and held against longitudinal movement. The grinding shafts 13 are equipped with pulleys 29, receiving belts 30 and 31, the belt 31 being crossed to cause the grinding wheels to be driven in the direction of the arrows in Fig. 11 of the drawings, the inner grinding portions of the wheels moving downwardly so that there is no tendency of the grinding devices to lift the saw tooth from a tooth supporting dog 32. By driving the grinding shafts by means of separate belts, as shown, the grinding wheels may be easily rotated at a high speed.

The bearing brackets are maintained in proper pivotal adjustment by means of adjusting screws 33 and coiled springs 34, mounted on supporting screws 35 extending through openings 36 in the sides 1 and 2 of the frame and having inner threaded ends 37, which are secured in threaded openings 38 in the bearing brackets. The coiled springs 34, which are located exteriorly of the sides of the frame, are interposed between the same and the heads of the screws 35, and they urge the bearing brackets outwardly and maintain the same in engagement with the adjusting screws 33. Washers 39 are preferably arranged on the screws 35 at the heads thereof to fit against the outer ends of the coiled springs 34. The adjusting screws 33 are mounted in threaded openings 40 in the front upwardly projecting portions or extensions 9 of the sides of the frame, and they bear against bosses 41 of the fixed sections of the front bearings 11. The screws are adapted to force the bearing brackets inwardly against the action of the coiled springs for maintaining the grinding wheels in proper position with relation to the saw.

The side 2 of the frame of the machine is provided with a front forwardly extending integral guide 42, arranged horizontally and receiving a reciprocatory carriage or slide 43 and provided with a beveled upper bearing edge 44. The slide or carriage, which is provided at its inner side with a vertical bearing or clamp 45, has an outwardly extending upper portion 46, which is hung upon the guide 42. The over-hanging portion 46 is provided with a recess 47, tapered upwardly in width and presenting an inclined face to the beveled upper edge of the guide 42. The slide or carriage is also recessed or cut-away at its bearing face at 48 to provide spaced upper and lower bearing portions to fit against the inner side face of the guide, and the top portion of the slide or carriage is provided with oil holes or passages 49, extending downwardly from the top of the slide or carriage and communicating with the tapered recess 47 for enabling the upper beveled bearing edge of the guide to be lubricated. The vertical clamp or bearing, which receives a vertical stem 50 of a horizontal bearing 51, is split and the side portions are provided with spaced ears 52, which are connected by a screw 53, engaging a threaded opening in one of the ears and bearing at its head against the other ear, and adapted to draw the side portions of the split clamp or bearing together to create pressure on the stem 50 of the bearing 51. The stem is preferably held against rotary movement by means of a key 54, mounted within the split clamp or bearing and sliding in a vertocal groove 55 of the stem 50, but any other suitable means may be employed for holding the stem and the bracket against rotary movement to prevent any lateral swinging movement of the saw. The horizontal bearing 51 is split at the top and is provided at opposite sides with ears 56, which are adjustably connected by a screw 57, adapted to draw the sides of the horizontal top bearing together to create friction for resisting rotary movement of a saw carrying spindle 58 to prevent the same from rotating until it is positively actuated by the means hereinafter described. The saw carrying spindle is provided at its inner end with a head 59 to which the saw 16 is detachably secured by any suitable means. In the accompanying drawings, the saw 16 is clamped against the head 59 by a plate or member 60, held against the saw by means of a screw 61, a slotted plate 62 and a washer 63 being preferably interposed between the head of the screw 61 and the clamping plate or member 60. The plate 62 preferably consists of a disk provided with a slot 64, which straddles the screw at the inner face of the washer 63, and it is adapted to be removed to permit the clamping plate or member 60 and the saw to be detached without removing the screw 61, the clamping plate and the saw having openings of sufficient size to enable them to be passed over the washer 63. Any suitable means may, of course, be employed for centering the circular saw on the head 59 of the horizontal saw carrying spindle, and as such means does not constitute a portion of the present invention, illustration thereof is deemed unnecessary.

The spindle 58 extends outwardly beyond the outer end of the horizontal bearing and supports a coiled spring 65, interposed between the outer end of the horizontal bearing 51 and a collar 66, arranged on the outer portion of the spindle 58 and fitted against a rod or pin 67, which is adapted to serve as a handle for enabling the spindle to be rotated by hand to present any of the teeth of the saw to the grinding wheels. The rod or pin 67 extends through a transverse perforation of the outer end of the spindle 58, but any other suitable means may be employed for manually rotating the spindle. The coiled spring is also adapted to operate in the nature of a brake similar to the split horizontal bearing, and it causes the head 59 of the spindle to frictionally engage the inner end of the bearing 51, so as to resist rotary movement of the spindle and thereby prevent accidental rotation of the same. This will prevent the circular saw from being rotated rearwardly when the tooth supporting dog 32 moves downwardly or rearwardly on the saw from one tooth to another in the operation of the machine. The means for frictionally engaging the spindle 58 also prevents the saw from being rotated too far forwardly by the dog 32 when the saw is reciprocated in the direction of the grinding wheels, as hereinafter fully described.

The tooth supporting dog 32, which is curved longitudinally, extends upwardly from a fixed pivot 68, consisting of a stub shaft having one end threaded to receive a nut 69, and provided adjacent to the same with a shoulder, formed by a collar or enlargement 70. The threaded end of the stub 68 pierces the side 1 of the frame of the machine, the collar or enlargement fitting against the inner face of the side 1 and the nut 69 engaging the outer face of the same, as clearly shown in Fig. 8 of the drawings. The stub shaft receives a sleeve 71, and the tooth supporting dog, which is provided at its lower end with an opening 72 for the stub shaft, is secured to the sleeve by screws 73, piercing the dog above and below the opening 72. The sleeve is provided at its outer end adjacent to the collar or enlargement 70 with an annular groove 74, which is engaged by one end of a spring 75, secured at its other end to the inner face of the side 1 of the frame. The spring 75, which is disposed in an approximately horizontal position, extends inwardly and forwardly from the inner face of the side 1 of the frame of the machine, and it is flexed inwardly to engage it with the groove 74, so that the spring 75 tends to urge the sleeve outwardly on the stub shaft in a direction of the side 1, the movement of the sleeve and the dog being limited by an adjusting screw 76, mounted in a threaded opening 77 of the side 1 of the frame and provided at its outer end with a head and having its inner end engaging the spring 75. By adjusting the screw 76, the sleeve 71 is forced inwardly against the action of the spring, and the dog is thereby maintained in proper position with relation to the saw. The sleeve 71 is equipped at the front with a weight 78, secured by screws 79 to the sleeve and adapted to automatically swing the dog 32 forwardly to maintain the same in proper contact with the saw 16, and to cause the dog to move forwardly from the position illustrated in full lines in Fig. 5 to the position illustrated in dotted lines in the said figure, when the slide or carriage is moved outwardly by the means hereinafter described. This outward sliding movement from the full line position in Fig. 5 carries the dog supported tooth forwardly beyond the dog 32, which drops into engagement with the next succeeding tooth, and the saw through the means, which frictionally engages the spindle 58, is prevented from being rotated rearwardly by the dog in moving downward over the saw from one tooth to the other, as previously referred to. When the slide or carriage is moved inwardly from the dotted position illustrated in Fig. 5 of the drawings to the full line position, the dog 32 partially rotates the saw and brings the engaged tooth into position to be operated on by the grinding wheels, and when the tooth is carried through the space between the grinding wheels, the curvature of the arc described by the outer end of the dog is so slight that the tooth moves practically in a horizontal direction; but the position of the tooth may be changed and the tooth adjusted with respect to the grinding wheels by the means hereinafter described, so that the curved faces of the latter will properly operate on the tooth. As the cutting portion of the tooth is passed horizontally between the grinding wheels below or beyond the plane of the coincident horizontal axis thereof (see Fig. 5) without any vertical movement, the grinding wheels will concave the side faces of the tooth, the latter narrowing upwardly from the bottom or lowest point where it is the widest. The dog is provided at its outer end with a tooth receiving notch 80, which presents angularly related upper and lower edges to the teeth of the saw, and the inner end of the recess 80 extends inwardly beyond the cutting edge of the saw, so that the cutting edge of the tooth does not come in contact with the dog at the crotch of the recess 80. The saw tooth operated on by the grinding wheels rests upon and is supported by the lower wall of the notch or recess 80, and the downward movement of the inner grinding portions of the wheels tends to hold the tooth upon the seat formed by the dog 32, and there is no liability of the saw accidentally rotating in a forward direction, while a tooth is being operated on by the grinding wheels.

The saw supporting means is equipped with an adjusting device for raising and lowering the saw carrying spindle to change slightly the position of the saw tooth with relation to the grinding wheels. This adjustment is effected by means of a vertically disposed screw 81, mounted in a threaded opening of a lug 82 and provided at its upper end with a milled head. The lower end of the adjusting screw 81 bears against the upper edge or face of the slide or carriage 43, and by rotating the screw the horizontal bearing 51 may be raised or lowered. By adjusting the grinding wheels and the horizontal bearing, the side dress of the teeth of the saw may be obtained.

The slide or carriage is reciprocated to automatically and successively present the teeth of the saw to the grinding wheels by means of an eccentric 83, mounted on a rear transverse shaft 84, and consisting of a disk or wheel provided with a curved series of perforations 85, located at different distances from the center of the crank element or wheel 83 and adapted to receive a crank or wrist pin 86, which pivots the rear end of a longitudinal rod or pitman 87 to the crank disk or wheel. The connecting rod or pitman 87, which is located at the side 2 of the frame of the machine, is provided at its front portion with a longitudinal series of perforations 88, adapted to receive a projecting pin 89 on which the connecting rod or pitman is secured by means of a key 90, or other suitable fastening means. The circular series of perforations of the crank element enables the mechanism to be adjusted to move the slide or carriage the desired distance, and the longitudinal series of perforations 88 enables the slide or carriage to be adjusted the proper distance from the grinding wheel to suit the diameter of the saw to be dressed. When the eccentric or crank element is rotated, the slide will be reciprocated and the saw will be moved to and from the grinding wheels and will through the action of the tooth supporting dog be rotated with a step by step movement so as to present the teeth of the saw successively to the grinding wheels for dressing.

The shaft 84, which extends longitudinally across the back of the machine, is journaled in suitable bearings 91 and is equipped at the side 1 of the machine with a worm wheel 92, which meshes with a worm 93 of a longitudinal shaft 94. The shaft 94, which is journaled in suitable bearings 95 at the outer face of the side 1 of the frame, has keyed or otherwise secured to its rear end a pulley 96, adapted to receive a driving belt. The worm gearing reduces the speed and secures the desired travel of the slide or carriage 43. Any other suitable gearing, however, may be employed for actuating the slide or carriage in moving the saw to and from the grinding wheels, and other mechanism may be used for rotating the saw to present the teeth thereof successively to the grinding wheels. The means shown, however, is particularly advantageous as the saw teeth are supported by the dog, and the saw coöperates with the same in securing a step by step rotation.

Having thus fully described my invention, what I claim as new and desire to secure by Letters Patent, is:—

1. A machine for side dressing the teeth of circular saws including a pair of grinding wheels arranged to engage the opposite sides of a saw tooth, means for supporting a circular saw and for adjusting the same to present the various teeth thereof one at a time to the grinding wheels, and means for reciprocating the saw to carry a tooth thereof between the guiding wheels.

2. A machine for side dressing the teeth of circular saws including a pair of grinding wheels arranged to engage the opposite sides of a saw tooth, means for reciprocating the saw to carry a tooth thereof between the grinding wheels, and means for imparting a step by step rotary movement to the saw to present the teeth thereof successively to the grinding wheels.

3. A machine for side dressing the teeth of circular saws including opposite grinding wheels having plane peripheral grinding edges arranged opposite each other, a saw support adapted to receive a circular saw, and means for reciprocating the support to carry a tooth of the saw between the plane peripheral edges of the grinding wheels in a position so that the curvature of the peripheries of the wheels will grind the sides of the teeth back of the cutting edge and provide for the clearance of the saw tooth.

4. A machine for side dressing the teeth of circular saws including a pair of grinding wheels, a slide or carriage provided with means for supporting a circular saw, mechanism for imparting a reciprocatory motion to the slide or carriage to carry the saw to and from the grinding wheels, and a pivotally mounted dog arranged to receive and support a tooth of the saw and oscillated by the reciprocation of the slide or carriage to produce a step by step rotary movement of the saw so as to present successively to the teeth thereof the grinding wheels.

5. A machine for side dressing the teeth of circular saws including a pair of grinding wheels arranged to engage the sides of the teeth of a circular saw, a reciprocatory slide or carriage provided with a spindle for supporting the saw, a pivotally mounted dog arranged to engage and support a tooth of the saw and oscillated by the reciprocatory movement of the slide or carriage to impart a step by step rotary movement to the saw, and means for adjusting the spindle on the slide or carriage for changing the position of the saw teeth with relation to the grinding wheels.

6. A machine for side dressing the teeth of circular saws including a pair of grinding wheels, a reciprocatory carriage provided with means for supporting a circular saw, and a pivotally mounted tooth supporting dog arranged to engage the teeth of the saw and oscillated by the reciprocation of the carriage to impart a step by step rotary movement to the saw, said dog being provided with a weight arranged to maintain the dog in engagement with the saw.

7. A machine for side dressing the teeth of circular saws including a pair of griding wheels, a reciprocatory carriage provided with means for supporting a circular saw, and a pivotally mounted dog provided with a tapered tooth receiving recess and arranged to support the teeth as the same are operated on by the grinding wheels, said dog being oscillated by the reciprocation of the carriage to impart to the same a step by step rotation.

8. A machine for side dressing the teeth of circular saws including a pair of transversely disposed grinding wheels, a reciprocatory carriage movable longitudinally of the machine and provided with means for supporting a circular saw, and a weighted dog pivotally mounted below the grinding wheels and provided at its upper end with a seat adapted to receive a tooth of the saw and arranged to swing between the grinding wheels for supporting the tooth as the same is operated on by the said wheels.

9. A machine for side dressing the teeth of circular saws including a pair of grinding wheels, a reciprocatory carriage provided with a vertically adjustable bearing, a spindle mounted in the bearing and adapted to support a circular saw, a vertical screw connected with the bearing and engaging the carriage for raising and lowering the spindle, mechanism for reciprocating the carriage to carry the saw to and from the grinding wheels, and means for supporting the teeth of the saw while they are being operated on by the grinding wheels.

10. A machine for side dressing the teeth of circular saws including a pair of grinding wheels, a reciprocatory carriage having a bearing, a spindle mounted in the bearing and adapted to support a circular saw, means for reciprocating the carriage to carry the saw to and from the grinding wheels, a pivotally mounted dog arranged to engage the teeth of the saw and oscillated by the reciprocation of the carriage to impart a step by step rotation to the saw, and frictional means for resisting rotary movement of the spindle.

11. A machine for side dressing the teeth of circular saws including a pair of grinding wheels, a reciprocatory carriage provided with a split bearing, a spindle mounted in the bearing and having a head adapted to receive the circular saw, means for adjusting the split bearing to clamp the spindle to resist rotary movement of the same, and a coiled spring mounted on the spindle for holding the head thereof in frictional engagement with the bearing, and means for supporting the teeth of the saw as they are operated on by the grinding wheels.

12. A machine for side dressing the teeth of circular saws including a frame, pivotally mounted brackets arranged within the frame, a pair of grinding wheels mounted on the brackets, means for adjusting the brackets to move the grinding wheels toward and from each other, a reciprocatory carriage movable toward and from the grinding wheels, and means mounted on the carriage for rotatably supporting a circular saw so as to present its various teeth to the grinding wheels one at a time.

13. A machine for side dressing the teeth of circular saws including a frame, laterally swinging brackets having vertical pivots mounted on the frame, grinding wheels mounted on the brackets, a reciprocatory carriage provided with means for supporting a circular saw and movable toward and from the grinding wheels, springs connected with the brackets for urging the same outwardly, and adjusting screws mounted on the frame and forming stops for the brackets and adapted to move the same inwardly against the action of the springs.

14. A machine for side dressing the teeth of circular saws including a frame, brackets located within the frame and having enlarged upper portions provided with spaced bearings, said brackets being also provided at their lower ends with arms, upper and lower pivots mounted on the frame and pivoting the brackets, the lower pivots piercing the brackets, grinding wheels having shafts mounted in the bearings of the brackets, saw supporting means, and mechanism for actuating the same to move a saw to and from the grinding wheels.

15. A machine for side dressing the teeth of circular saws including grinding wheels, a reciprocatory carriage having means for supporting a circular saw and movable toward and from the grinding wheels, a horizontal shaft, a tooth supporting dog having a sleeve mounted on the shaft, said dog being arranged to engage the teeth of the saw and oscillated by the reciprocation of the carriage to impart a step by step rotation to the saw to present the teeth thereof successively to the grinding wheels, a spring connected with the said sleeve for urging the same in one direction, and an adjusting screw forming a stop for the sleeve and arranged to move the same in the opposite direction against the action of the spring.

16. A machine for side dressing the teeth of circular saws comprising a frame provided with a guide, a pair of grinding wheels, a reciprocatory carriage mounted on the guide and provided with means for supporting a circular saw and movable toward and from the grinding wheels, gearing including a crank element having a plurality of perforations located different distances from the center, a connecting bar provided with a longitudinal series of perforations, and pivots connecting the bar with the carriage and with the crank element and adapted to be arranged in the said perforations to secure the desired movement of the carriage and to arrange the latter to suit the size of the saw.

17. A machine for side dressing the teeth of circular saws including a pair of grinding wheels, a frame provided with a projecting horizontal guide, a carriage slidably mounted on the guide and provided with a vertical clamp, a horizontal bearing having a stem vertically adjustable in the said clamp, a saw supporting spindle mounted in the said bearing, and mechanism for reciprocating the carriage to move the saw toward and from the grinding wheels.

18. A machine for side dressing the teeth of circular saws comprising a frame, transversely adjustable brackets pivotally mounted in the frame and provided at the top with spaced bearings, grinding wheels having shafts mounted in the bearings of the brackets, a reciprocatory carriage mounted on the frame and provided with means for supporting a saw and movable toward and from the grinding wheels, an eccentric connected with the carriage for reciprocating the same to move the saw to and from the grinding wheels, a belt driven pulley, and worm gearing for transmitting motion from the latter to the eccentric.

19. A machine for side dressing the teeth of circular saws including a pair of grinding wheels having cylindrical peripheral grinding edges arranged opposite each other, and means for supporting the teeth of a circular saw between the cylindrical peripheral edges of the grinding wheels in a position so that the curvature of the periphery of the wheels will grind out the sides of the teeth back of the cutting edge and provide for the clearance of the saw teeth.

20. A machine for side dressing the teeth of circular saws including a pair of grinding wheels spaced apart and arranged to engage the opposite sides of a saw tooth, means for reciprocating a circular saw to carry a tooth thereof between the grinding wheels at a point beyond the coincident axis of the same, and means for adjusting the same to present its various teeth one at a time to the grinding wheels.

21. A machine for side dressing the teeth of circular saws including a pair of spaced grinding wheels having plane peripheral grinding edges and spaced apart to engage the opposite sides of a saw tooth, means for reciprocating a circular saw to carry a tooth thereof between the grinding wheels below the horizontal axis of the same in an inverted position, whereby the curvature of the peripheries of the wheels will grind the sides of the tooth back of the cutting edge and provide for the clearance of the saw tooth, and means for adjusting the same to present its various teeth one at a time to the grinding wheels.

In testimony, that I claim the foregoing as my own, I have hereto affixed my signature in the presence of two witnesses.

ARTHUR W. NELSON.

Witnesses:
J. J. HEINTZ,
GEO. S. KING.

---

Copies of this patent may be obtained for five cents each, by addressing the "Commissioner of Patents, Washington, D. C."